United States Patent [19]

Inada et al.

[11] Patent Number: 5,148,707
[45] Date of Patent: Sep. 22, 1992

[54] HEAT-SENSITIVE FLOW SENSOR

[75] Inventors: Masanori Inada; Hichiro Ohtani, Hyogo, Japan

[73] Assignee: Mitsubishi Denki K.K., Tokyo, Japan

[21] Appl. No.: 560,958

[22] Filed: Aug. 1, 1990

[30] Foreign Application Priority Data

Aug. 29, 1989 [JP] Japan .................. 1-222213

[51] Int. Cl.⁵ .................. G01F 1/68
[52] U.S. Cl. .................. 73/204.26
[58] Field of Search .......... 73/118.2, 204.15, 204.22, 73/204.23, 204.25, 204.26, 204.27

[56] References Cited

U.S. PATENT DOCUMENTS

| 4,366,704 | 1/1983 | Sato et al. | 73/204.25 |
| 4,393,697 | 7/1983 | Sato et al. | 73/118.2 |
| 4,803,875 | 2/1989 | Kuhn et al. | 73/204.26 |
| 4,805,452 | 2/1989 | Eiermann et al. | 73/204.26 |
| 4,823,462 | 4/1989 | Huber | 73/118.2 |
| 4,870,860 | 10/1989 | Ohta et al. | 73/204.26 |

Primary Examiner—Herbert Goldstein
Attorney, Agent, or Firm—Sughrue, Mion, Zinn, Macpeak & Seas

[57] ABSTRACT

In a heat-sensitive flow sensor including a bridge circuit composed of a heat-sensitive resistor formed on a substrate provided within a fluid flow passage and a plurality of resistors and a control circuit for controlling current supplied to the heat-sensitive resistor to maintain the bridge circuit in a thermally balanced condition, a flow rate being detected from the thermal balance condition of the bridge circuit, current supply leads and a base portion of the substrate are buried in a heat insulating support member supported by a base. Preferably, lead terminals of the heat-sensitive resistor formed on the base portion are also buried in the heat insulating support member.

6 Claims, 2 Drawing Sheets

HEAT-SENSITIVE FLOW SENSOR

BACKGROUND OF THE INVENTION

The present invention relates to a heat-sensitive flow sensor utilizing a heat-sensitive resistor to detect flow rate of fluid.

A flow rate detection system based on a balancing condition of a bridge circuit including a heat-sensitive resistance disposed in fluid is well known and widely used as shown in Japanese Kokai (Utility model) 61-108930, and an air flow sensor using a heating resistor comprising a heat-sensitive resistance in the form of a thin film resistor of platinum formed on a ceramic substrate is also known.

FIG. 2 illustrates an operation of the heat-sensitive flow sensor. In FIG. 2, a base 2 is provided at a predetermined position in a housing 1 which is adapted to be used as a main passage of fluid, on which a heat-sensitive resistor 3 and an air temperature sensor 4 are arranged. A bridge circuit is constituted with the heat-sensitive resistor 3 and the air temperature sensor 4 and resistors R1 and R2 connected in series with these elements, respectively. A differential amplifier 101 has input terminals connected to junctions b and f of the bridge circuit and an output terminal connected to a base of a transistor 102 whose emitter is connected to a terminal a of the bridge circuit and whose collector is connected to a positive pole of a power source 103.

FIG. 3 shows a support structure of the heat-sensitive resistor 3. In FIG. 3, the heat-sensitive resistor 3 is supported at opposite ends 6 thereof by a pair of holding members 5 of electrically conductive material upstanding on an electrically insulating support member 7 in such a way that surfaces of the heat-sensitive resistor 3 lie along a flow direction of fluid with longitudinal edges thereof being orthogonal to the flow direction.

An operation of this conventional sensor is well known and, therefore, a detailed description thereof is omitted. However, when voltages at the junctions b and f become equal, this circuit is balanced and a current I corresponding to the flow rate flows through the heat-sensitive resistor 3, so that a voltage Vo at the point b becomes I X R1. The voltage Vo is used as a flow rate signal.

In order to improve a detection response of the conventional heat-sensitive flow sensor constructed as mentioned above to a variation of flow rate of fluid to be measured, it is a recent tendency that, as the heat-sensitive resistor 3, a ceramic substrate having thickness of, for example, 0.2 to 0.1 mm is used. Since such a thin substrate is fragile, it is easily broken by external mechanical force such as distortion of various structural portions of the conventional structure due to temperature variation during assembly or use. Further, since thermal conductivity of the holding member 5 is large, heat loss from the heat-sensitive resistor 3 to the holding member 5 is large, resulting in degraded measuring sensitivity and degraded measuring response.

As other prior art systems Japanese Kokai (Patent) 56-162014, 63-298120 and 63-307315 show the use of thin film heat sensitive resistors for flow rate sensors.

SUMMARY OF THE INVENTION

An object of the present invention is to provide a heat-sensitive flow sensor having high measuring sensitivity and high response to flow rate variation.

The inventive heat-sensitive flow sensor which is adapted to be disposed in a fluid passage, includes a ceramic substrate, a bridge circuit including a heat-sensitive resistor formed on the substrate and a plurality of resistors and a control circuit for controlling a current flowing through the heat-sensitive resistor to maintain the bridge circuit in a thermally balanced state and operates to detect a flow rate from the balanced state of the bridge circuit, the sensor according to the present invention is characterized by lead terminals of the heat-sensitive resistor being provided on a base portion of the ceramic substrate are connected to current supply leads and the base portion as well as the current supply leads are buried in a support member of thermal insulating material and the support member is mounted on a base.

In the present invention in which the base portion of the substrate on which the heat-sensitive resistor is formed is buried in the support member, no stress produced in the support member due to thermal distortion caused by temperature variation is applied to the substrate in a thickness direction of the support member. Further, since the support member is of thermal insulating material, heat conduction from the base to the support member is minimized and thus degradation of measuring sensitivity as well as response thereof to temperature variation is minimized.

DETAILED DESCRIPTION OF THE PREFERRED EMBODIMENTS

An embodiment of the present invention will be described with reference to FIGS. 1a to 1c.

Figure 1A:
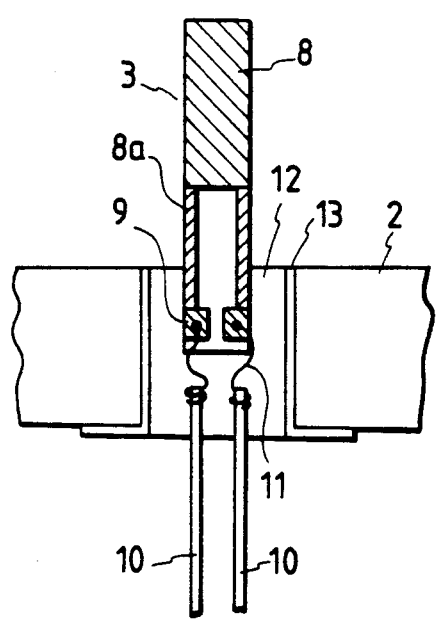
FIG. 1a shows an embodiment of a heat-sensitive resistor according to the present invention.

FIG. 1a shows a construction of a heat-sensitive flow sensor according to an embodiment of the present invention. In FIG. 1a, a substrate 3 which is preferably of ceramic includes a portion on which a heat-sensitive resistor 8 is formed and a base portion on which leads 8a in the form of legs having lead terminals 9 at respective ends thereof are formed. The lead terminals 9 are connected electrically through leads 11 to current supply leads 10, respectively.

The base portion and the current supply leads 10 are buried in a support member 12 of thermal insulating material. The support member 12 is supported by a base 2 through a metal plate 13 so that the heat-sensitive resistor 8 can be protruded from one side surface of the base member 2.

Since only the base portion of the substrate 3 is buried in the support member 12, stress due to thermal distortion is not applied thereto in the thickness direction thereof, preventing damage of the heat-sensitive resistor 8. Further, since the support member 12 is of thermal insulating material, heat conduction from the base 2 to the support member 12 is negligibly small, preventing degradation of measuring sensitivity and response.

When a low melting point glass having a compatible thermal expansion coefficient with the substrate 3 is used as the material of the support member 12, the mechanical strength of the support member 12 buried in the substrate increases and so workability during the manufacture is improved.

Figure 1B:
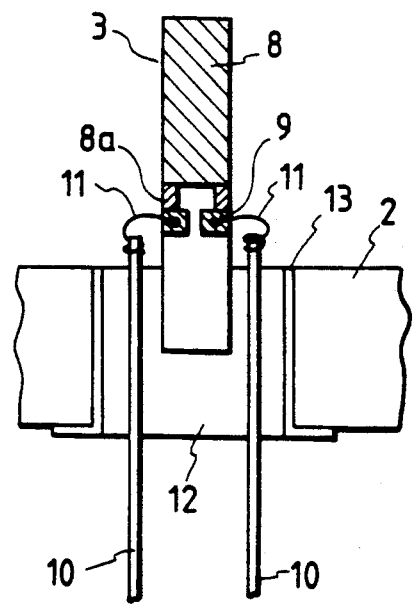
FIG. 1b shows another embodiment of the heat-sensitive resistor.

FIG. 1b shows another embodiment of the heat sensitive resistor 8. In FIG. 1b, the legs of the heat sensitive resistor 8 are made shorter compared with that shown in FIG. 1a, so that the lead terminals 9 thereof together with the current supply leads 10 are exposed from the support member 12. The effect of this embodiment is substantially the same as that obtained by the embodiment shown in FIG. 1a.

Figure 1C:
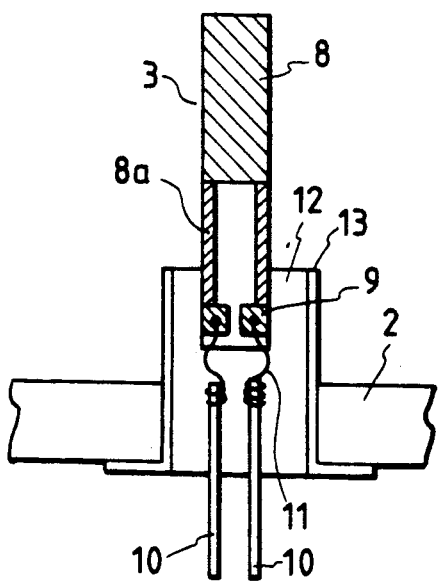
FIG. 1c shows a further embodiment of the heat-sensitive resistor.
Figure 2:
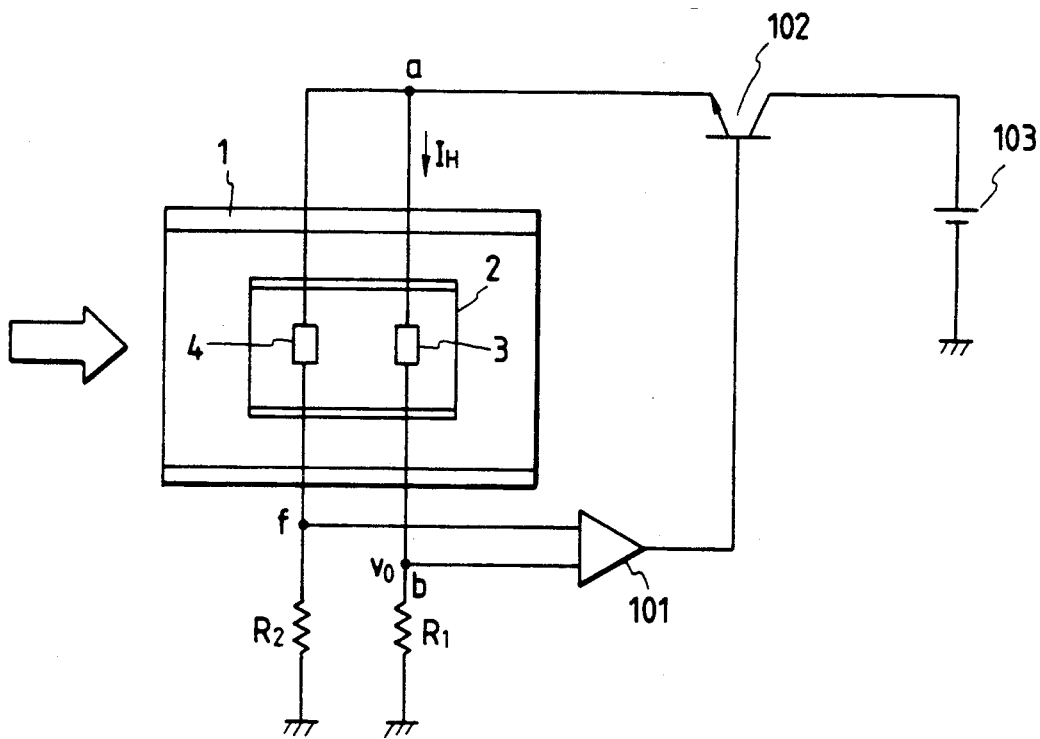
FIG. 2 shows a circuit construction of a conventional heat-sensitive flow sensing device.
Figure 3:
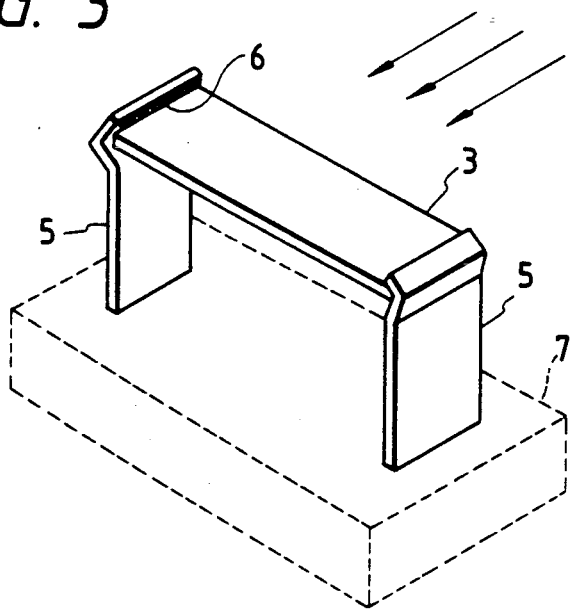
FIG. 3 shows a construction of a conventional heat-sensitive flow sensor.

FIG. 1c shows a further embodiment of the heat sensitive resistor 3 in which the base 2 is made thinner than that shown in FIG. 1a, so that a contact area of the support member 12 with the base 2 is made smaller to reduce heat conduction from the base 2 to the support member 12.

As described above, according to the present invention, the lead terminals provided on the base portion of the ceramic substrate which forms the legs of the heat-sensitive resistor are connected to the current supply leads and the base portion is buried in the heat insulating support member and the latter is supported by the base. Therefore, the heat-sensitive resistor can be assembled without external mechanical force applied to the ceramic substrate and hence without damage to the heat-sensistive resistor. Further, with the construction having the base portion of the heat-sensitive resistor is buried in and supported by the heat insulating support member, heat conduction from the base to the support member is small as mentioned previously, resulting in a heat-sensitive flow sensor having high measuring sensitivity and high response.

What is claimed is:

1. A heat-sensitive flow sensor including a bridge, circuit composed of a heat-sensitive resistor formed on a substrate provided within a fluid flow passage and a plurality of resistor said a control circuit for controlling current supplied to said heat-sensitive resistor to maintain said bridge circuit in a thermally balanced condition, a flow rate being detected from said thermally balanced condition of said bridge circuit, said flow sensor comprising:
   a base;
   a heat insulating support member supported by said base, said substrate having a base portion on which lead terminals of said heat-sensitive resistor are formed and connected to current supply leads, wherein said heat insulating support member comprises a material having a thermal expansion coefficient compatible with that of said substrate;
   a metal plate positioned between said base and said heat insulating support member such that said heat-sensitive resistor protrudes from one side surface of said base; and
   means for preventing stress produced in said support member due to thermal distortion caused by temperature variations from being applied to said substrate in a thickness direction of said support member, said stress preventing means comprising said base portion of said substrate being an only portion of said substrate buried in said heat insulating support member.

2. The sensor claimed in claim 1, wherein said substrate comprises a material ceramic.

3. A heat-sensitive flow sensor including a bridge circuit composed of a heat-sensitive resistor formed on a substrate provided within a fluid flow passage and a plurality of resistors and a control circuit for controlling current supplied to said heat-sensitive resistor to maintain said bridge circuit in a thermally balanced condition, a flow rate being detected from said thermally balanced condition of said bridge circuit, said flow sensor comprising:
   a base;
   a heat insulating support member supported by said base, said substrate having a base portion on which lead terminals of said heat-sensitive resistor are formed and connected to current supply leads, said heat insulating support member comprising a material having a thermal expansion coefficient compatible with that of said substrate; and
   means for preventing stress produced in said support member due to thermal distortion caused by temperature variations from being applied to said substrate in a thickness direction of said support member, said stress preventing means comprising said base portion of siad substrate being an only portion of said substrate buried in said heat insulating support member, said substrate comprising a ceramic material.

4. The sensor claimed in claim 2, wherein said lead terminals together with said current supply leads are buried in said support member.

5. The sensor claimed in claim 3, wherein a portion of said base portion of said substrate having no lead terminals formed thereon and said current supply leads are buried in said support member.

6. A heat-sensitive flow sensor including a bridge circuit composed of a heat-sensitive resistor formed on a substrate provided within a fluid flow passage and a plurality of resistors and a control circuit for controlling current supplied to said heat-sensitive resistor to maintain said bridge circuit in a thermally balanced condition, a flow rate being detected from said thermally balanced condition of said bridge circuit, said flow sensor comprising:
   a base;
   a heat insulating support member supported by said base, said substrate having a base portion on which lead terminals of said heat-sensitive resistor are formed and connected to current supply leads, wherein said heat insulating support member comprises a material having a thermal expansion coefficient compatible with that of said substrate; and
   means for preventing stress produced in said support member due to thermal distortion caused by temperature variations from being applied to said substrate in a thickness direction of said support member, said stress preventing means comprising said base portion of said substrate being an only portion of said substrate buried in said heat insulating support member, said substrate comprising a ceramic material,
   wherein said support member is thicker than said base.

* * * * *